C. L. BOWEN.
HAY PRESS.
APPLICATION FILED JULY 2, 1908.
913,873.
Patented Mar. 2, 1909.
3 SHEETS—SHEET 1.
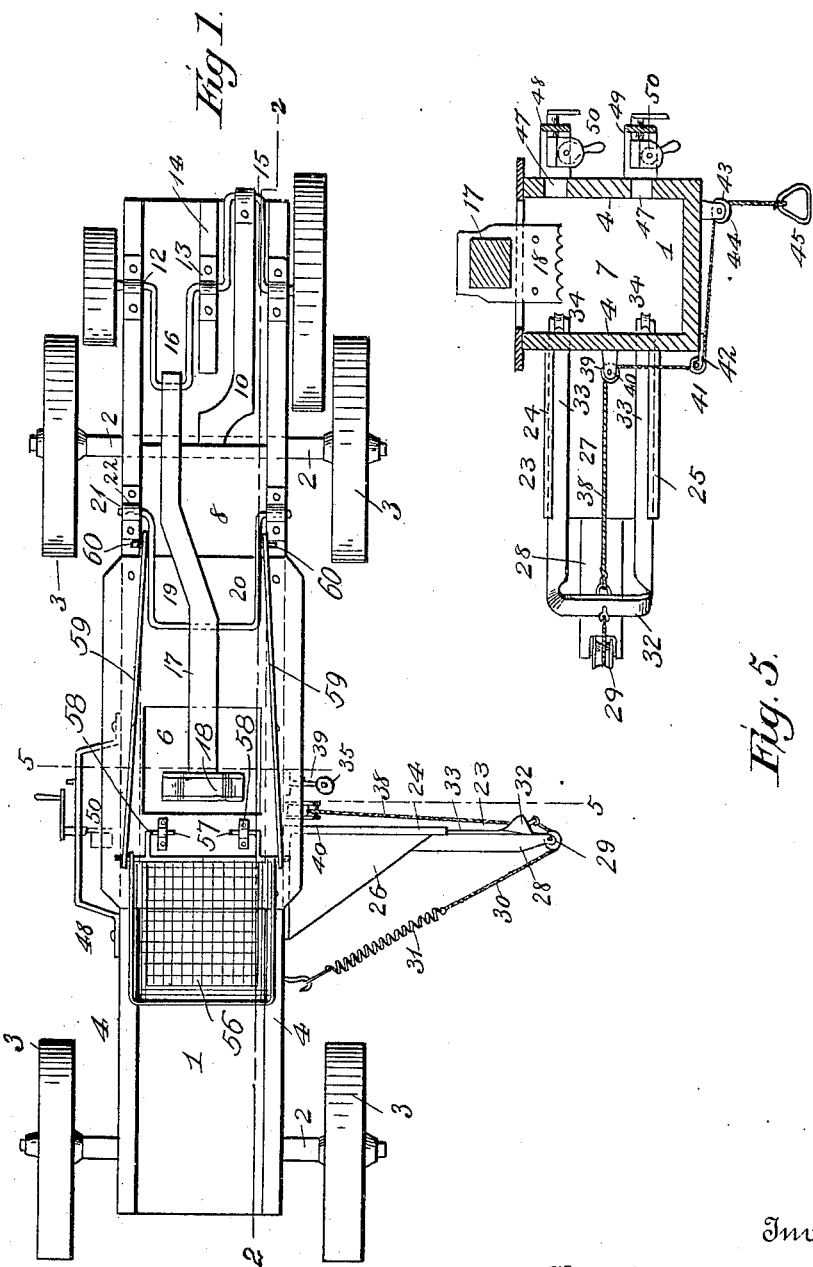
Witnesses
F. L. Ourand
C. H. Griesbauer
Inventor
Chas L. Bowen,
By H. B. Willson & Co.
Attorneys C. L. BOWEN.
HAY PRESS.
APPLICATION FILED JULY 2, 1908.
913,873.
Patented Mar. 2, 1909.
3 SHEETS—SHEET 2.
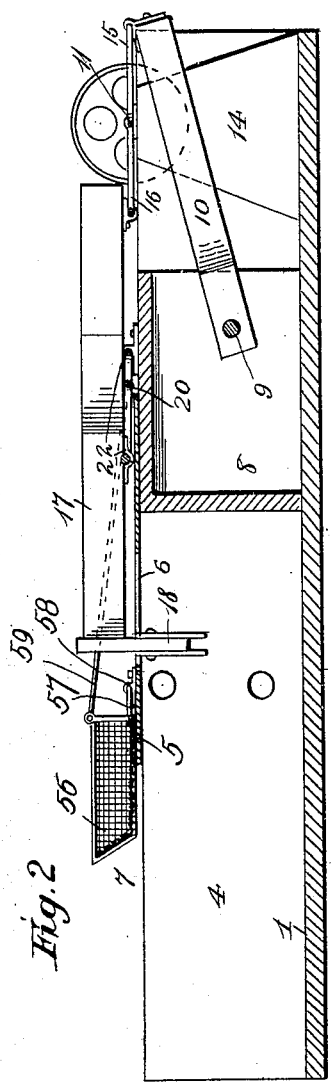
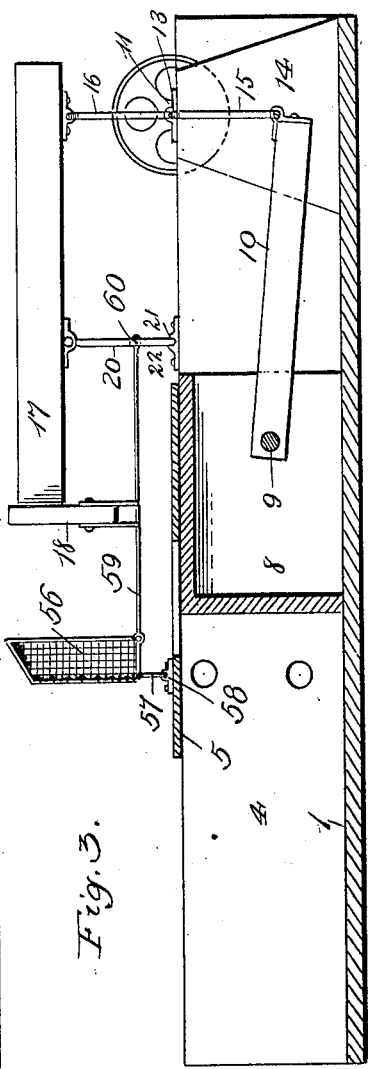
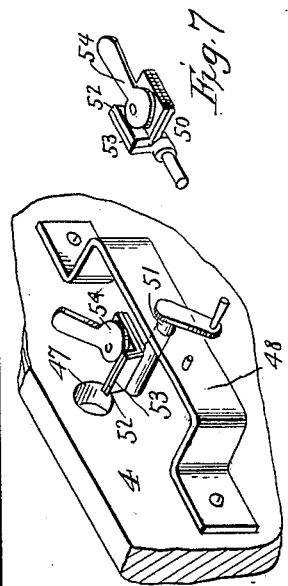
Witnesses
F. L. Ourand
C. H. Griesbauer
Inventor
Chas. L. Bowen,
By H. B. Willson & Co.
Attorneys

C. L. BOWEN.
HAY PRESS.
APPLICATION FILED JULY 2, 1908.

913,873.

Patented Mar. 2, 1909.
3 SHEETS—SHEET 3.

Witnesses
F. L. Ourand
C. H. Griesbauer

Inventor
Chas L. Bowen.
By H. B. Willson & Co.
Attorneys

UNITED STATES PATENT OFFICE.

CHARLES L. BOWEN, OF NEWARK, ILLINOIS.

HAY-PRESS.

No. 913,873.  Specification of Letters Patent.  Patented March 2, 1909.

Application filed July 2, 1908. Serial No. 441,524.

*To all whom it may concern:*

Be it known that I, CHARLES L. BOWEN, a citizen of the United States, residing at Newark, in the county of Kendall and State of Illinois, have invented certain new and useful Improvements in Hay-Presses; and I do declare the following to be a full, clear, and exact description of the invention, such as will enable others skilled in the art to which it appertains to make and use the same.

My invention relates to hay presses, and particularly to that type which have semi-automatic needle and tying mechanisms.

One of the objects of the invention is to provide a press of this character which may be cheaply and strongly made, and which will be efficient and thorough in operation, and which will require only one operator to handle same.

A further object of the invention is to provide a novel feeding mechanism which acts at a predetermined time to force the material being baled into the baling chamber in such a manner that it will be picked up by the baling plunger and operated upon so as to form a bale of even dimensions. Furthermore, the feeding mechanism will be moved entirely out of the way of the feed opening at the time the plunger is at the limit of its rearward stroke so as to permit the bunches of hay to be placed above the opening to be subsequently engaged by the downward stroke of the feeding device and forced into the baling chamber.

A further object of the invention is the provision of novel means for tying the wire around the bale and the provision of a needle mechanism to be used in connection therewith.

With these and other objects in view, the invention consists of certain novel features of construction, combination and arrangement of parts, as will be more fully described and particularly pointed out in the appended claims.

Figure 4:
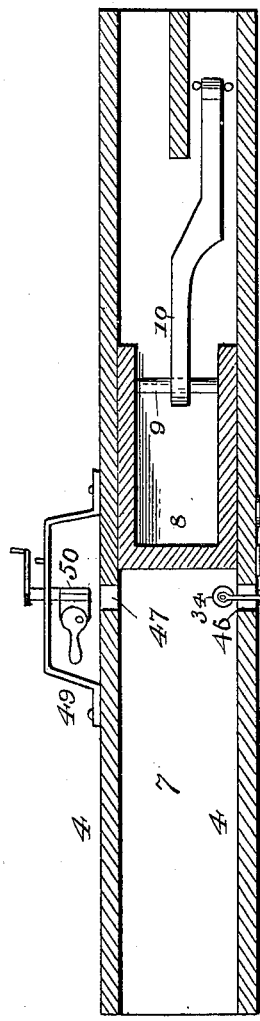
Figure 6:
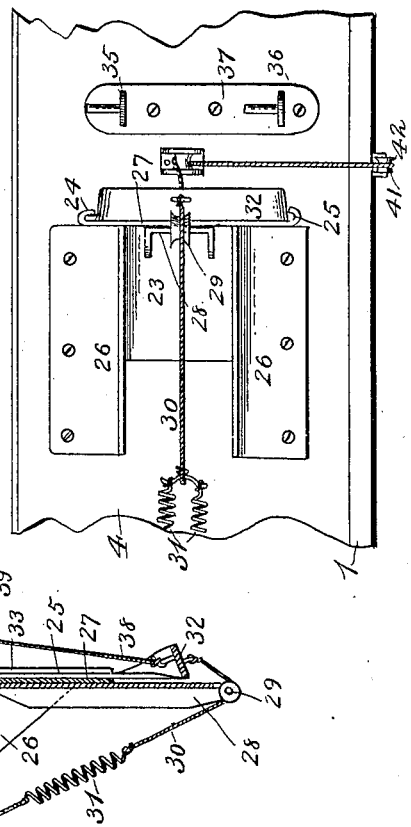

In the accompanying drawings, Figure 1 is a top plan view of the hay press, Fig. 2 is a detail section on the line 2—2 of Fig. 1 showing the plunger in retracted position, Fig. 3 is a similar section showing the plunger partly in retracted position and with the feeding arm raised, Fig. 4 is a horizontal sectional view of the press, Fig. 5 is a transverse sectional view on the line 5—5 of Fig. 1, Fig. 6 is a detail side elevation, and Fig. 7 is a detail perspective view of one of the twisting devices removed from their supporting brackets. Fig. 8 is a similar view of the twisting mechanism mounted in its bracket on the side wall of the press.

Referring more especially to the drawings, 1 represents the base of the press which is mounted upon the usual axles 2, and supporting wheels 3. Projecting up from the base are the side pieces 4, which are connected together at the top by a plate 5, having formed therein an aperture 6, to admit the material to the baling chamber 7.

Slidably mounted upon the base 1 between the sides 4 is the plunger 8, which is provided with a pin 9, extending across from side to side and adapted to pivotally receive the pitman 10. This pitman is connected at its opposite end to the crank shaft 11, which is journaled in bearings 12, carried upon the side members and also in bearings 13, mounted upon the central pillar 14. The crank shaft 11 is provided with two crank sections 15 and 16, the former being secured to the pitman 10 and the latter being secured to the feed arm 17 on the opposite side of the press. The outer or free end of the feeding arm is provided with a feeding fork or hand 18, which is adapted to centrally enter the aperture 6 and force the hay into the baling chamber 7, as shown. In order to accomplish this the arm 17 is offset as at 19, so as to bring the hand in the center of the aperture. Intermediate the length of the arm 17 I pivot thereto a U-shaped bale 20, which has its legs of the same length as the crank arms and are outwardly turned to form bearing arms 21, which are secured in bearings 22, mounted upon the side pieces 4.

As shown in Figs. 1 and 2 the plunger is retracted and the feeding hand or fork is depressed into the aperture 6. Upon further movement of the crank shaft 11 in the proper direction the plunger starts its forward movement and the feeding hand or fork, together with its operating arm 17 starts its rearward movement pivoting upon the bale 20 so that the motion of the arm 17 and hand 18 is substantially parallel with the press until the crank arm 16 passes its horizontal center at such time the hand 18 is raised and the rear end of the arm 17 depressed. This depression is greatest of course when the crank arm 16 is in its lowermost position. When it starts upon its upward stroke the hand is started forward and downward and the plunger 8 is then retracted. This continues until the parts are returned again to their original starting position. The last part of the downward movement of the hand is very rapid owing to the fact that the pivoting bale 20 is substantially flat upon the press and the crank arm 16 is passing its horizontal center.

The crank arms 15 and 16 are of the same length as the pivoting bale 20, and the crank shaft 13 is mounted in bearings on a level or in the same horizontal plane as the outwardly turned arms 21, on the pivoting bale 20. This makes the movement of the arm 17 parallel with the press for a considerable distance or while the crank section 16 and the bale 20 are rising from their horizontal position. Projecting outwardly from the casing slightly beyond the feeding aperture 6 is a needle frame 23, which comprises a pair of connected guide ways 24 and 25, which are braced by diagonal brackets 26, the lower one of the said brackets not being shown. The guide members 24 and 25 are connected together by a bridge piece 27, upon which is secured the projecting pulley support 28, having journaled in its end a pulley 29, from which the tension cord 30 is connected. This tension cord is secured at one end to a spring 31, which is connected to the side 4 of the casing. The opposite end of the tension cord is carried by the connecting bar 32, which joins the needles 33, so that they are properly spaced and held in the guides 24 and 25. The outer end of each needle is provided with a friction pulley or roller 34, over which the wire from the spools is adapted to pass. These spools are held upon the brackets 35 and 36, carried upon a plate 37, secured to the side of the casing and arranged so as to be substantially in alinement with the rollers 34. Connected to the connecting bar 32 is an operating rope or chain 38, which passes over a suitable pulley 39, carried upon a bracket 40, affixed to the casing. From here the operating rope or chain passes over the pulley 41, mounted upon the bracket 42, which is secured to the bottom of the casing and from thence across the bottom of the casing to a suitable pulley 43, carried in the bracket 44. The end of the operating rope or chain is provided with a stirrup 45, which may be engaged by the foot of the operator so as to force the needles across the casing through the openings 46 and 47.

As shown in Figs. 1 and 4 I provide a pair of supporting brackets 48 and 49, which each have journaled in their front sides a wire twisting device 50, better shown in Figs. 7 and 8 where the journal shaft 51 is shown to have a plurality of clamping plates 52 and 53, connected thereto, one of which is loosely mounted with respect to the other so as to permit the clamp lever 54 which is adapted to force it into engagement with the anvil or stationary plate so as to clamp the wire therebetween.

The operation of the needle and tying mechanism will now be described. First of all the wire is secured to the clamping device and is fed off the spools by the action of the hay in the baling chamber. After the bale has acquired the proper size the operator inserts his foot in the stirrup and presses down thereupon thus carrying the needles with their wire across the press through the openings 46 and 47, where it is again secured to the clamps. It is then twisted to join the two ends and cut off with the portion connected to the spool remaining in the clamps, and the operation is then repeated. The spring 31 returns the needles to normal position.

In Figs. 1, 2 and 3, of the drawings I have shown a feeding trough or basket 56, which has extending from its lower part a pair of arms 57, which are pivotally engaged with eyes 58, formed upon the top of the frame 1. The upper end of the forward portion of the basket has connected thereto the links 59, which are pivoted at 60, to the bale 20. As the bail 20 rises it raises the rear end of the basket and dumps the hay into the opening 6 where it will be subsequently acted upon by the feeding hand or fork 18.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

Having thus described my invention, what I claim and desire to secure by Letters Patent is:—

1. In a baling press, the combination with a plunger, of a pitman connected thereto, a crank shaft secured to the pitman for reciprocating the plunger, a feeding device also connected to the crank shaft, and means to cause a movement of the feeding device whereby during a certain portion of its movement it will remain in parallel planes with the plunger, but substantially transverse thereto in another portion of its movement.

2. In a baling press, the combination with a plunger, of a pitman connected thereto, means secured to the pitman for reciprocating the plunger, a feeding device connected to said reciprocating means, and means to cause the feeding device to travel in parallel planes with the plunger during substantially one-half of the movement of the reciprocating means but substantially transverse to the plunger in another portion of its movement.

3. In a baling press, a plunger, a crank shaft having a pair of oppositely disposed crank arms, a pitman connected to the plunger and to one of the crank arms, a feeding device connected to the opposite crank arm, and a bale pivoted to the press and to the feeding device intermediate its connection with the crank arm and its operating end, said bale causing a movement of said feeding device whereby for a portion of its travel it will be substantially parallel with the plunger and at substantial right angles thereto for another portion of its movement.

4. In a device of the class described, a baling chamber, a baling plunger therein, a feeding plunger, means for holding hay, and means controlled by said feeding plunger for dumping said hay holding means.

5. In a hay press, a baling chamber, a baling plunger working therein, a feeding plunger working transversely to the baling plunger, and a hay basket pivoted upon the press over the baling chamber.

In testimony whereof I have hereunto set my hand in presence of two subscribing witnesses.

CHARLES L. BOWEN.

Witnesses:
JOHN PRICKETT,
ERNEST S. GOODELL.